Patented Nov. 18, 1941

2,263,012

UNITED STATES PATENT OFFICE 2,263,012

PROCESS FOR MAKING NATURAL COLOR PHOTOGRAPHS

Karl Schinzel, Rochester, N. Y., assignor to Eastman Kodak Company, Rochester, N. Y., a corporation of New Jersey No Drawing. Application December 17, 1938, Serial No. 246,489. In Austria December 23, 1937

7 Claims. (Cl. 95—6)

In the method of multi-color photography in which colored or color-forming compounds are contained in a sensitive layer, it seems to be of advantage to destroy the dyes in the places of the residual silver halide by oxidation or catalysis, or to reduce them by vatting, although this presupposes a complementary color negative. The latter may be obtained by printing from a reversal positive.

*Various image forming methods and general remarks*

For the purpose of carrying out the process herein described, layers relatively poor in silver or extremely thin may be used if the formation or destruction of the dyes takes place in the layers by catalytic means, because then relatively large quantities of the oxidising or reducing agent can be made effective, and therefore entirely insoluble (leuco) dyes which may even be stable in an acid medium can now be employed; likewise the precipitants for the dye derivatives can be attacked. If the dye is destroyed in the exposed parts positives can be obtained at once. An increased effect can also be obtained if both the indophenol produced on development contains in itself further oxidising molecular residues and the silver reduced with the indophenol is converted into oxidising or catalytic combinations or is used as an inductor or catalyst. A silver image can also be converted by means of a lead ferricyanide intensifier into a mixture consisting of a small proportion of silver ferrocyanide plus a large proportion of lead ferrocyanide; the intensification may be repeated. If desired the lead ferrocyanide can be converted into a silver salt e. g. silver ferrocyanide, the latter reduced, and treated once more with the lead intensifier etc., or used for catalysis in the presence of, for example, KCN or thiourea.

*Removal of first vat dye image by reduction*

For copying from the previously mentioned negatives or positives triple layers may be used which contain particularly easily re-oxidisable, non-diffusing alkali salts of high molecular acyl derivatives or the like of leuco vat dyes as described hereinafter. After first development the residual silver halide, as a rule AgCl, is converted into an oxidising agent or catalyst and the leuco vat dye is oxidised in these places and the high molecular residue is at the same time split off; the dye is then reduced with hydrosulphite and alkali and washed out, if need be with exclusion of air, and from the residual leuco derivative the dye is regenerated by a powerful oxidising agent. The high molecular dye derivatives may be incorporated in the layers as completely insoluble salts of the dyes formed with for example, quinine or di-phenyl-guanidine, since they are decomposed in the alkali of the developer. If dye is produced by oxidation in the exposed places an aproximately complementary coloured negative is obtained, which can serve for copying even if the high molecular residual leuco derivatives remain in it. If however dye is formed in the exposed places containing silver, then reduced and washed out and the residual leuco derivative in the unexposed places oxidised, a positive results.

*Use of insoluble dyes, etc.*

It should be specially observed that it has now been found that colour photographs true to nature can be obtained by employing completely insoluble vat dyes and reducing them or by employing insoluble salts of their leuco ester acids and re-oxidising them.

For the reduction with thio-urea, HCl, HBr or HI in the places containing silver, it has been known to use azo dye salts formed with organic bases, but they are by no means entirely insoluble (see German Patents 617,208 and 611,324 and Jahrb.f.Phot. 1905/311). It has now been found that completely insoluble higher molecular beta naphthol-azo dyes especially those produced with cyanuric chloride, without sulphonic or carboxylic groups are split by reduction by acidified thio-urea solution or by diluted HBr or HCl.

According to the invention, induced or catalytic image-forming oxidation is brought about by the use of vat dyes which are regenerated from their insoluble or non-diffusible or hardly diffusible leuco sulphuric acid ester salts, leuco sulphuric acid ethers, or numerous other leuco derivatives which are analogous or of like effect (see my application Serial No. 177,738, filed Dec. 2, 1937) without colour fog or substantial image degradation by employing mild catalysts (for example iron salts), or sufficiently oxidation stable vat dyes. Such oxidation stable dyes are, for example, flaventhrene, perylenequinone, benzanthrone, dibenzanthrone or thio-indigo or their halogen substitution products or other similar derivatives.

It is advantageous to use the colloidal soluble non-diffusing alkali salts of the high molecular leuco ester acids or salts with, for example, aliphatic amines, guanidine. If unsaturated acids have been used for esterification of the leuco derivatives they are best oxidised in image formation by using osmium with bromate or chlorate.

The production of poorly defined images which may occur when dissolved oxidising agents or catalysts are employed, is minimised by adsorption of the insoluble or non-diffusing dye generator or dye, as the case may be, on the silver halide grain. In any case, it is an advantage to absorb the dye or dye generator on to the silver halide, since even when the silver halide or when the reduced silver is converted into an oxidising agent or a catalyst, the action takes place mainly in the immediate neighborhood of the grain, that which over and above this diffuses into the layer can easily be rendered innocuous by the addition of sugars, aldehydes, alcohols or other easily oxidisable substances added to the solution or layer or by employing as precipitants for the leuco sulphuric acid esters those bases which contain easily oxidisable groups, for example, amino groups, oxy groups, or vinyl groups; such bases are amino- or diamino-acridine or acridinium, fuchsine, quinine.

In the use of vanadic acid diffusion thereof is prevented by the addition of barium chloride to the bromate solution or by the use of barium chlorate, and if desired ferrocyanide can also be added to the solution. Likewise an addition of o-hydroxy-quinaldine or its dibromide, quinaldine or similar complex-forming substances is advantageous in the case of vanadic acid, iron salt and other catalysts.

Removal of non-used dye derivatives by alkali and washing

It was hitherto doubtful whether by imagewise reduction of insoluble vat dyes by, for example, KCN or insoluble reducing agents, useful three colour images were obtainable, because owing to the alkali released in the process or intentionally added there is an extremely great tendency to re-oxidation by the atmospheric oxygen. It is known that the reduced vat dyes have a great tendency to re-oxidise. Hence it was not to be expected that, with KCN, reduction of vat dyes in the silver-containing places succeeds even in the presence of air. Of course, it is better to work with the exclusion of air in order to obtain pure whites, presuming that one completely removes the reduced product by alkali, ammonia, di or tri-ethanolamine or other amines or other suitable solvents. In the present invention the easily washed out products of reduction may be degradation products or colourless, or even intensely coloured leuco derivatives as in the case of numerous anthraquinone dyes. The alkaline bath for washing out the reduced products can be applied at a late stage in the processing, especially when working with the exclusion of air. Of course, in all the processes of U. S. Patent 2,227,981, granted and of this application, the products of reduction or destruction should be removed from the triple layer if they are not sufficiently stable to light and air; similarly, one should remove the residual leuco esters or the like if necessary after splitting up the insoluble salts thereof by alkali.

Complex reduction of the dye

While KCN in the presence of alkali or ammonia can be used to reduce the vat dyes which are most difficult of reduction, in the case of the more easily reducible quinone or lignone dyes, certain thio-indigos, particularly mixed unsymmetrical thio-indigo derivatives, sulphur dyes and the disulphides of dyes (or compounds of a dye character synthetically produced by means of dithio-salicylic acid-dichloride or the like) one can use for example alkali sulphide or alkali hydrosulphide or if desired cyanamide, dicyanodiamidine, cyanuramide, thio-glycolate of sodium, thio-cyanates, thio-urea, thio-semi-carbazide or its products of condensation with glyoxylic acid, acetaldehyde-disulpho acid or numerous similar S or N containing substances which have a complex forming action on Ag, or even ammonia, aliphatic amines, or guanidine may in some circumstances be sufficient. Some of such reducing agents have already been suggested for the reductive splitting up of azo-dyes for example thioglycollic acid in an acid solution, but it has not hitherto been published that they can also serve for reduction of vat dyes in an alkaline solution, especially with the exclusion of air. My experiments show that vat dyes cannot be reduced by acid thiourea solution.

According to the present invention leuco products of vat dyes, quinone or lignone dyes, dye di-sulphides or sulphur dyes or the like which are insoluble in acid reducing agents, are after reduction removed from the image by a subsequent bath of dilute caustic alkali, ammonia, amines, guanidine, or the like, this being best done in the absence of atmospheric oxygen on account of the time of treatment required to allow for the diffusion from the bottom layer.

When KCN is employed it can be partly replaced by thio-glycolate of sodium or cyanamide or by other generators of complexes e. g. dimethylgloxime, benzimidazoles or triazoles. An addition of KBr usually has a favourable effect. Some layers can contain vat dyes, others azo dyes. Azo dyes which are insoluble in alkali and are reduced to the stable hydrazo stage, may be employed in the invention.

In order that the products of the destruction of azo dyes shall not turn yellow, the layer may be bathed in hydroquinone or other reducing agents, as already proposed for ozalide copies (Z. f. wiss. Phot. vol. 33/1–12). In cases where the decomposition products are insoluble, having no $SO_3H$, COOH or p-hydroxy groups, the o- or p-amino-phenol which has been produced by reduction can be subsequently removed by an alkaline bath. To the emulsions may be added stable leuco derivatives of certain thio-indigo dyes, hydro-coerulignone, reduced Russig dye or hex-iodo-indigo (B. 57/2125), beta-tetrahydroflavan-thrane, leuco-indophenols and the like, and by means of sodium carbonate, with the exclusion of air, can be used as developers to develop the latent light image or the residual silver halide, and the unconsumed residue can be removed by caustic alkali. The leuco vat dyes can for this purpose first be added to emulsions in the form of their esters with chloro-formic acid, benzylcarbonic acid, formaldehyde, benzaldehyde, etc. (see application Serial No. 177,738, filed Dec. 2, 1937) and subsequently split.

A platinised silver image may be employed with the exclusion of air as an oxidising image whereupon the remaining portion of the leuco vat dye is removed by caustic alkali (B .58/488,2788).

When the residual silver halide is reduced by for example manganous carbonate or oxalate or stannous hydroxide which may precipitate inside the triple layer, a two-fold reducing action can be obtained on the dye in the places containing silver by the simultaneous action of the residual hydroxide and of the KCN which is present. Alternatively, one may employ a developer which contains complexly bound manganous, ferrous or stannous compounds, and the reducing effect of which is released by alkali, here too if necessary in the presence of KCN.

High molecular vat dye derivatives

In order, from high molecular indigo sols, to remove the high molecular residue and regenerate the simple vat dye, of which examples have already been given in the U. S. Patent 2,227,981, it appears necessary that, in the image-wise or diffuse oxidation, the high polymer residue having a $SO_3H$, $COOH$, $OH$, $SH$, $—CH_2$ group for example, which confers solubility, should be split off. For this purpose one may employ leuco vat dyes which are converted into the carbamic, allophanic acid or benzyl carbonic acid ester, in which the benzene ring of the latter contains an $NH_2$ group, obtainable by careful reduction of the $NO_2$ group of nitro-benzyl-carbonic-acid-chloride after esterification of the leuco dye. Similarly numerous analogous esters, particularly with a couplable $OH$ or $NH_2$ group, are easily produced according to application Serial No. 177,738 and can also be used in the invention, or anthraquinone dyes having for example an $OH$, dimethyl-amino, acylamino, acylmethyl-amino, methylmercapto group, are reduced down to the anthrone form or the latter is produced by condensation, and the methylene group is condensed with an amino aldehyde or hydroxy aldehyde, if necessary also reduced; or likewise numerous other meso derivatives having an aliphatic or an aromatic substituent, which carries an $OH—$, amino or $SH$ group or the like, are easily producible according to application Serial No. 177,738 or even the substitution products of meso anthramine and meso anthradiamine. The foregoing classes of compounds are then further reacted as follows: (a) Into the ester groups or meso substituents of the above which can easily be split off or hydrolised, there are now introduced, by action on their amino, hydroxy, mercapto, carboxyl, or sulphonic acid groups situated in the detachable residue, according to known methods (U. S. application Serial No. 151,811), high molecular or high polymer residues in particular those having free $SO_3H—$, $COOH$, or an hydroxyl group and bromine substituents in both ortho position thereto or by means of polyvalent compounds one may, for example, link together many molecules of the (leuco) dye in order to obtain products whose alkali or ammonium salts do not diffuse through gelatine. (b) The amino, hydroxy or mercapto group is reacted with alpha-bromo-stearic acid, or such group may be reacted with oleic acid chloride or ricinoleic acid chloride and afterwards sulphurised, or the aliphatic hydroxyl group is reacted with chlorsulphonic acid. Instead of alpha-brom-stearic acid one may use alpha-Br-Palmitylic acid bromide after which the alpha bromo group is replaced by an $SO_3H$ group by boiling with sulphite. (c) One may form dye derivatives using chloro carbonic acid cetyl ester (French Patent 425,370) or polyacrylic-acid-chloride or the chlorides of other high polymer carboxylic acids or sulphonic acids, or of mixed polymerisates. One can use in the invention their alkali, lithium or ammonium salts which form highly colloidal aqueous solutions. (d) Amino-resorcinol can be reacted with α-bromstearic acid, and the acid chloride of the product (easily obtainable by phosgene) is allowed to react with the $NH_2$ group of the leuco dye derivatives mentioned above in the presence of tertiary amines, in order to obtain dye derivatives which are colloidally soluble in alkalies and do not diffuse through gelatine.

(e) Chloro-acetyl-chloride is first allowed to act on the $NH_2$ or $SH$ group and the resulting product is allowed to react with the sulphonic acid of o- or p-amino oleyl-benzene.

(f) One may react alpha bromo-stearoyl-bromide with the $NH_2$ group then the alpha bromine atom is condensed with the $NH_2$ group of an amido-phenyl-methyl-pyrazolone or vice versa in order to obtain products which, by virtue of the acid methylene group, yield pseudo solutions in alkalies.

(g) Dye derivatives containing a high molecular residue suitable for use in the emulsion and splittable by reduction are made as follows. The $NH_2$ group of the first mentioned compounds is diazotised and coupled with a high molecular molecule e. g. hydroxy-oleyl-benzene or a stearoyl-amino-beta-naphthol or with their sulphonic or carboxylic-acids or with a polymer e. g. polyvinyl-phenol. Alternatively a diazo-oleyl benzene, or a diazo-stearoyl-amino-naphthalene may be coupled with the correspondingly substituted leuco derivative which may, of course, also contain $SO_3H$ or carboxyl groups and is obtainable for example by the action of salicylic acid chloride on the carbamic or allophanic acid ester of thio-indigo-white (see application Serial No. 177,738).

High molecular dye derivatives can be made by diazotising an amino vat dyestuff and forming a mixed azo vat dye and in this way a considerable change of the colour is obtainable enabling these azo vat dyes to be added to the layers without hindering the passage of the light rays in an undesirable way.

Such compounds can be made as follows:

(a) Isato-acid anhydride or nitro benzoyl chloride is allowed to react, (after reaction the nitro group is reduced) on amino-anthraquinone, amino-indanthrene, amino-thio-indigo or on other vat dye (see for example B.58/825, 57/640, 56/1309) having $NH_2$, $OH$ or $SH$ groups, or on the NH group of the indole ring of indigoid dyes. The external amino group is then diazotised and coupling effected with the previously mentioned suitable high molecular components which may contain sulphonic acid groups.

(b) Similarly one may couple diazo-anthraquinone or other diazotisable amino vat dyes with such high molecular components.

(c) Allow salicoyl-chloride or hydroxy-naphthoyl-chloride to react on the $NH_2$, $OH$ or $SH$ vat dye and then couple the product with the previously mentioned high molecular diazo compounds.

These azo vat dyes can be added to the layers, if desired as their insoluble salts. Image formation can be brought about by reduction in the presence of alkali, using for example KCN and at the same time the azo bond is split and then the leuco vat dye so liberated can be washed out. It is better however to split the azo double bond (diffusely) before the reduction step by hydrosulphite in neutral solution or other mild reducing agents and then reduce to form the image.

The corresponding leuco sulphuric acid esters of these azo vat dyes may be produced and if desired the addition product with bisulphite (on the azo double bond).

These high molecular azo vat dyes or their sulphonic or carboxylic acids, which form non-diffusing alkali salt solutions, could also be split by reduction by acidified thio-urea or inorganic acids (NCl, HBr, HI) this being best done in the presence of KBr, so that, in the parts containing silver, the simple vat dye is formed. In this case, in contrast to the processes previously mentioned herein, the residual unused azo vat dye, in spite of its SO₃H or COOH or OH groups, cannot be washed out; the simple vat dye produced by reduction can be removed if one uses such alkaline reducing agents as do not act on the azo double bond of the unused azo vat dye; if such reduction reduces the vat dye portion of the azo vat dye this does not matter because, in spite of the alkali, it is non-diffusing. Finally, by treatment with an acid reducing agent the vat dye itself or its easily re-oxidisable leuco derivative is liberated from the azo vat dye contained in the parts free from silver. It is still best to select those azo vat dyes in which the vat dye portion is reduced when the azo bond is split so that the vat dye part can be washed out by caustic alkali on the parts where the silver exists. From the residual unused azo vat dye derivative remaining in each layer the high molecular part is then first split off by general reduction, and then re-oxidised to give vat dye, or conversely the unused azo vat dye derivative is first re-oxidised and then reduced, by for example, acid thio-urea solution; if the dye derivative is not present as an insoluble salt then in order that no diffusion should take place, one should add to the reduction bath, for example, diphenyl guanidine, cinchonine. This also applies for the high molecular azo derivatives formed from meso derivatives of the anthrone form of anthraquinone dyes in which, in the meso substituent (which can be split off by oxidation) there is present in the portion of the molecule situated between the anthraquinone and the azo bond a SO₃H or COOH group conferring solubility, which remains after the image-wise splitting of the azo bond and the split dye is therefore washed out. The residual unused azo-anthraquinone derivative is then oxidised to give the simple anthraquinone dye which does not now contain any solubilising groups. Instead of the solubilising groups being present in the substituent they may be present in the anthraquinone nucleus itself, but in this case precipitants must be present during the oxidation of the unused anthraquinone derivative.

What I claim is:

1. The method of producing a colored photographic image in a gelatino-silver halide emulsion layer, which comprises diazotizing a low molecular weight dye selected from the class consisting of vat and triphenylmethane dyes and coupling it with a compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

2. The method of producing a colored photographic image in a gelatino-silver halide emulsion layer, which comprises diazotizing a low molecular weight vat dye and coupling it with a compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

3. The method of producing a colored photographic image in a gelatino-silver halide emulsion layer, which comprises diazotizing a low molecular weight substituted anthrone dye and coupling it with a compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

4. The method of producing a colored photographic image in a gelatino-silver halide emulsion layer, which comprises diazotizing a low molecular weight dye selected from the class consisting of vat and triphenylmethane dyes and coupling it with a high-molecular weight compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

5. The method of producing a colored photographic image in a gelatino-silver halide emulsion layer, which comprises diazotizing a low molecular weight dye selected from the class consisting of vat and triphenylmethane dyes and coupling it with a high-polymeric compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

6. The method of producing a colored photographic image in a gelatino-silver halide emulsion layer, which comprises diazotizing a low molecular weight vat dye and coupling it with a high-molecular weight compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

7. The method of producing a colored photographic image in a gelatino-silver halide emulsion layer, which comprises diazotizing a low molecular weight vat dye and coupling it with a high-polymeric compound containing a solubilizing group and incorporating this azo compound in a sensitive layer, exposing and developing a silver image in the layer, destroying the azo bond of the dye and reducing the dye to a soluble form in the region of the silver image, and washing the decomposed dye components from the layer.

KARL SCHINZEL.